United States Patent
Oohashi

(10) Patent No.: US 11,479,840 B2
(45) Date of Patent: Oct. 25, 2022

(54) PASS ROLL FOR HOT-DIP GALVANIZED STEEL SHEET MANUFACTURING FACILITY, HOT-DIP GALVANIZED STEEL SHEET MANUFACTURING FACILITY, AND HOT-DIP GALVANIZED STEEL SHEET MANUFACTURING METHOD

(71) Applicant: NIPPON STEEL CORPORATION, Tokyo (JP)

(72) Inventor: Tooru Oohashi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 17/044,731

(22) PCT Filed: Apr. 18, 2019

(86) PCT No.: PCT/JP2019/016634
§ 371 (c)(1),
(2) Date: Oct. 1, 2020

(87) PCT Pub. No.: WO2019/225236
PCT Pub. Date: Nov. 28, 2019

(65) Prior Publication Data
US 2021/0062319 A1 Mar. 4, 2021

(30) Foreign Application Priority Data
May 23, 2018 (JP) .............. JP2018-098931

(51) Int. Cl.
C23C 2/00 (2006.01)
C23C 2/06 (2006.01)
C23C 2/40 (2006.01)
F16C 13/00 (2006.01)

(52) U.S. Cl.
CPC ............. C23C 2/003 (2013.01); C23C 2/06 (2013.01); C23C 2/40 (2013.01); F16C 13/00 (2013.01)

(58) Field of Classification Search
CPC ... C23C 2/003; C23C 2/06; C23C 2/40; F16C 13/00; B32B 1/00; B32B 5/00; B32B 15/14; B32B 2262/0269; B32B 2307/306; B32B 2307/536; D04H 1/4382
See application file for complete search history.

(56) References Cited

U.S. PATENT DOCUMENTS 5,364,331 A 11/1994 Higashino et al.
11,313,181 B2 * 4/2022 Sugino ............... E21B 17/042

FOREIGN PATENT DOCUMENTS

| JP | 54-117333 A | 9/1979 |
| JP | 55-139164 U | 10/1980 |
| JP | 63-30974 B2 | 6/1988 |
| JP | 6-25349 U | 4/1994 |
| JP | 2000-64014 A | 2/2000 |

OTHER PUBLICATIONS

English translation of JP 2000064014A. (Year: 2022).*

* cited by examiner

Primary Examiner — Hai Y Zhang
(74) Attorney, Agent, or Firm — Birch, Stewart, Kolasch & Birch, LLP

(57) ABSTRACT

A pass roll for a hot-dip galvanized steel sheet manufacturing facility, the pass roll includes: a roll body; and a heat-resistant felt layer covering the roll body, wherein the heat-resistant felt layer has a thermal decomposition temperature of 420° C. or higher and has a surface hardness evaluation index at 400° C. of more than 0.11 μm/N.

20 Claims, 3 Drawing Sheets

# PASS ROLL FOR HOT-DIP GALVANIZED STEEL SHEET MANUFACTURING FACILITY, HOT-DIP GALVANIZED STEEL SHEET MANUFACTURING FACILITY, AND HOT-DIP GALVANIZED STEEL SHEET MANUFACTURING METHOD

TECHNICAL FIELD

The present invention relates to a hot-dip galvanized steel sheet manufacturing facility.

BACKGROUND ART

In a hot-dip galvanized steel sheet manufacturing facility, a galvanizing treatment is performed on a steel strip by immersing the steel strip in a galvanizing bath. The hot-dip galvanized steel sheet manufacturing facility is provided with a plurality of rolls (hereinafter, "pass rolls") along a steel sheet manufacturing line in order to achieve both the reduced size of the facility and the securement of the treatment time of each treatment performed on the steel strip. The steel strip discharged out of a coil is sent via the pass rolls to the downstream side while being folded back many times on the steel sheet manufacturing line.

When the steel strip comes into contact with the pass roll, a micro-slip may occur between the steel strip and the pass roll. The micro-slip possibly causes peeling of the galvanized layer from the surface of the steel strip, and the peeled zinc adheres to the pass roll. The zinc adhering to the pass roll possibly adheres to the surface of a subsequent steel strip or causes indentation, resulting in a cause of poor quality. Note that a phenomenon that the zinc peeled off the surface of the steel strip adheres to the circumferential surface of the pass roll is called zinc winding in this description.

As a method of suppressing the occurrence of the zinc winding, Patent Document 1 discloses the use of a roll made of a phenol resin using mineral fibers as a base material. Besides, Patent Document 2 discloses that a material made by mixing a rubber binder and an inorganic filler in fibers having heat resistance and chemical resistance is used for the roll surface. Patent Document 3 discloses that a ground fabric made of heat-resistant fibers, and a non-woven fabric layer composed of a non-woven fabric made of para-aramid fibers and a non-woven fabric made of PBO (polyparaphenylene benzobisoxazole) fibers, are provided on the roll surface.

PRIOR ART DOCUMENT

Patent Document

Patent Document 1: Japanese Laid-open Patent Publication No. S54-117333
Patent Document 2: Japanese Examined Patent Application Publication No. S63-030974
Patent Document 3: Japanese Laid-open Patent Publication No. 2000-064014

SUMMARY OF THE INVENTION

Problems to be Solved by the Invention

The steel strip passing through the galvanizing bath is immersed in molten zinc, so that the surface of the steel strip is at high temperature on the exit side of the galvanizing bath. Therefore, the steel strip whose surface becomes high temperature comes into contact with the pass roll arranged near the exit side of the galvanizing bath, resulting in that the surface temperature of the pass roll increases. In this case, in the pass roll disclosed in Patent Document 1, the phenol resin thermally decomposes, so that the function of suppressing the occurrence of the zinc winding of the pass roll is gradually lost. Similarly, the rubber binder thermally decomposes in the pass roll disclosed in Patent Document 2, so that the function of suppressing the occurrence of the zinc winding of the pass roll is gradually lost. Accordingly, in the pass rolls in Patent Documents 1, 2, maintenance of the pass rolls needs to be frequently performed to keep the effect of suppressing the occurrence of the zinc winding, leading to reduced productivity. Further, although the pass roll disclosed in Patent Document 3 has a surface layer composed of PBO fibers, the effect of suppressing the occurrence of the zinc winding cannot be obtained in some cases depending on the pass roll manufacturing conditions and the operating conditions, and there is room for improvement in terms of stably manufacturing the hot-dip galvanized steel sheet with good quality.

The present invention has been made in consideration of the above circumstances and its object is to increase the productivity of a hot-dip galvanized steel sheet by obtaining, stably and for a longer period, the effect of suppressing the occurrence of zinc winding by a pass roll for a hot-dip galvanized steel sheet manufacturing facility.

MEANS FOR SOLVING THE PROBLEMS

An aspect of the present invention to solve the above problem is a pass roll for a hot-dip galvanized steel sheet manufacturing facility, the pass roll including: a roll body; and a heat-resistant felt layer covering the roll body, wherein the heat-resistant felt layer has a thermal decomposition temperature of 420° C. or higher and has a surface hardness evaluation index at 400° C. of more than 0.11 μm/N.

An aspect of the present invention according to another viewpoint is a hot-dip galvanized steel sheet manufacturing facility, wherein the above pass roll is a roll configured to pass a steel strip subjected to hot-dip galvanizing in a galvanizing bath.

An aspect of the present invention according to still another viewpoint is a hot-dip galvanized steel sheet manufacturing method for manufacturing a hot-dip galvanized steel sheet by immersing a steel strip in a galvanizing bath on a steel sheet manufacturing line, wherein the hot-dip galvanized steel sheet is manufactured by using, as a pass roll configured to pass the steel strip subjected to hot-dip galvanizing in the galvanizing bath, a pass roll including a roll body covered with a heat-resistant felt layer, the heat-resistant felt layer having a thermal decomposition temperature of 420° C. or higher and having a surface hardness evaluation index at 400° C. of more than 0.11 μm/N.

EFFECT OF THE INVENTION

It is possible to increase the productivity of a hot-dip galvanized steel sheet by obtaining, stably and for a longer period, the effect of suppressing the occurrence of zinc winding by a pass roll for a hot-dip galvanized steel sheet manufacturing facility.

EMBODIMENTS FOR CARRYING OUT INVENTION

Figure 1:
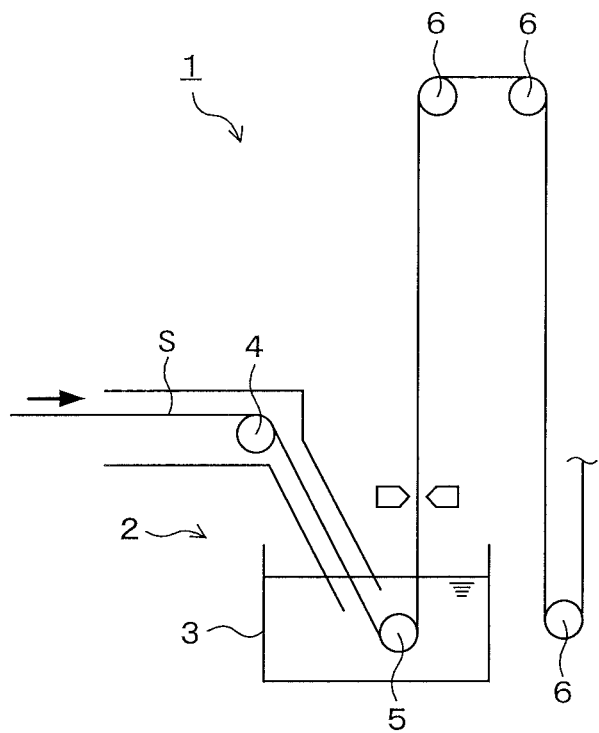
FIG. 1 is a diagram illustrating a partial configuration of a hot-dip galvanized steel sheet manufacturing facility according to an embodiment of the present invention.

Hereinafter, an embodiment of the present invention will be explained referring to the drawings. Note that in this description and the drawings, the same codes are given to components having substantially the same functional configurations to omit duplicated explanation.

As illustrated in FIG. 1, a hot-dip galvanized steel sheet manufacturing facility 1 in this embodiment includes a hot-dip galvanizing apparatus 2 which performs a galvanizing treatment on a steel strip S. The hot-dip galvanizing apparatus 2 includes a galvanizing bath 3 storing molten zinc, a pass roll 4 arranged on the upstream side of the galvanizing bath 3 on a steel sheet manufacturing line (hereinafter, an "entry-side pass roll"), and an in-bath roll 5 arranged in the galvanizing bath 3, and a pass roll 6 arranged on the downstream side of the galvanizing bath 3 on the steel sheet manufacturing line (hereinafter, an "exit-side pass roll"). The steel strip S runs along an arrow direction in FIG. 1 while changing the traveling direction via the entry-side pass roll 4, the in-bath roll 5, and the exit-side pass roll 6 along the steel sheet manufacturing line. Note that although the configuration of a part of the hot-dip galvanized steel sheet manufacturing facility 1 is illustrated in FIG. 1, the configuration on the upstream side of the galvanizing bath 3 is the same as in the prior art.

Figure 2:
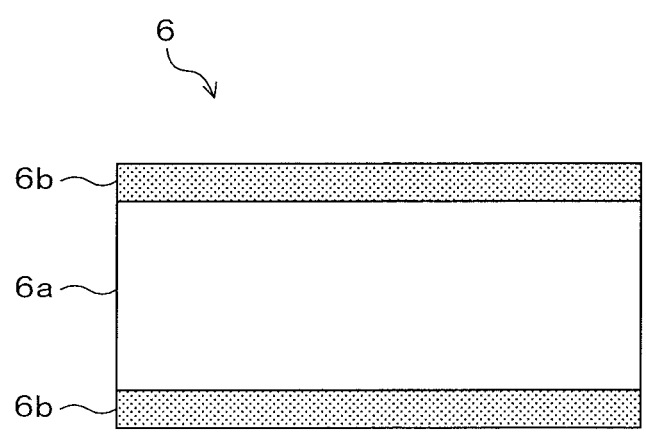
FIG. 2 is a cross-sectional view illustrating a schematic configuration of a pass roll according to an embodiment of the present invention.

The exit-side pass roll 6 arranged on the downstream side of the galvanizing bath 3 is composed of a roll body 6a and a heat-resistant felt layer 6b covering the roll body 6a as illustrated in FIG. 2. The heat-resistant felt layer" in this description means felt existing over the entire circumference of a surface part of the roll body 6a and made of heat-resistant fibers having a thickness in a radial direction of the roll body 6a. The felt is a nonwoven fabric defined in JIS L 0222, in which fibers oriented in one direction or randomly, the fibers being bonded together by interlacing, and/or fusion, and/or adhesion. The heat-resistant felt layer 6b is provided to cover the entire circumferential surface of the roll body 6a, so that when the steel strip S comes into contact with the exit-side pass roll 6, the steel strip S comes into contact with the heat-resistant felt layer 6b.

Note that the method of providing the heat-resistant felt layer 6b on the surface of the roll body 6a is not particularly limited. Examples of the method include a method of covering and fixing tubular felt made of heat-resistant fibers over the roll body 6a, a method of pasting felt made of heat-resistant fibers on the surface of the roll body 6a by lining, and a method of winding felt made of heat-resistant fibers having the same width as the full width of the roll body 6a around the roll body 6a or spirally winding felt made of heat-resistant fibers shorter than the full width of the roll body 6a around the roll body 6a. Besides, the heat-resistant felt layer 6b itself may be composed of a single layer or multiple layers. The heat-resistant felt layer having a multi-layer structure is obtained, for example, by covering tubular felt over the roll body 6a and further covering other tubular felt thereon, or by winding felt having the same width as the full width of the roll body 6a, in an overlapping manner, around the roll body 6a.

The heat-resistant felt layer 6b is manufactured from fibers having a thermal decomposition temperature of 420° C. or higher which is higher than the melting point of zinc (419.5° C.). The heat-resistant felt layer 6b in this embodiment has such a thermal decomposition temperature, so that the heat-resistant felt layer 6b does not thermally decompose even if the steel strip S after the galvanizing treatment comes into contact with the exit-side pass roll 6. Note that the upper limit of the thermal decomposition temperature is not particularly limited. The fibers constituting the heat-resistant felt layer 6b are not particularly limited as long as they are heat-resistant fibers having a thermal decomposition temperature of 420° C. or higher, but are preferably, for example, polyparaphenylene benzobisoxazole (PBO) fibers.

The exit-side pass roll 6 may have the multi-layer structure by providing another layer between the roll body 6a and the heat-resistant felt layer 6b. In the case where the exit-side pass roll 6 has the multi-layer structure, the heat-resistant felt layer 6b is provided on the outermost layer. The exit-side pass roll 6 preferably has a structure in which the heat-resistant felt layer 6b is in contact with the surface of the roll body 6a in order to exhibit the effect of suppressing the zinc winding for a longer period even in a state where abrasive deterioration advances.

The thickness of the heat-resistant felt layer 6b is preferably changed in a range of 1 to 20 mm according to the facility configuration, the operating condition and so on. In view of the heat-shrinkage property of the heat-resistant felt layer 6b, a smaller thickness of the heat-resistant felt layer 6b is better so as to decrease the change in roll diameter due to the change in temperature. From this viewpoint, the thickness of the heat-resistant felt layer 6b is preferably 20 mm or less. On the other hand, from the viewpoint of improving the durability of the heat-resistant felt layer 6b, the thickness of the heat-resistant felt layer 6b is preferably large to a certain degree, and is preferably 1 mm or more. Accordingly, the thickness of the heat-resistant felt layer 6b is preferably 1 to 20 mm. Further, from the viewpoint of improving the durability, the thickness of the heat-resistant felt layer 6b is more preferably more than 5 mm.

In the exit-side pass roll 6 in this embodiment, since the heat-resistant felt layer 6b is provided on the surface of the roll body 6a as above, the steel strip S after the galvanizing treatment is not in direct contact with the roll body 6a of the exit-side pass roll 6 and is thus unlikely to cause zinc winding. Further, the heat-resistant felt layer 6b of the exit-side pass roll 6 in this embodiment has a thermal decomposition temperature of 420° C. or higher, so that even if the steel strip S after the galvanizing treatment comes into contact with the exit-side pass roll 6, the heat-resistant felt layer 6b does not thermally decompose and can keep the effect of suppressing the occurrence of the zinc winding. This can decrease the frequency of performing the maintenance of the exit-side pass roll 6 and can increase the operating time of the hot-dip galvanized steel sheet manufacturing facility 1. This can increase the productivity of the hot-dip galvanized steel sheet.

Incidentally, when the present inventors analyzed the surface of the pass roll undergone the zinc winding in the pass roll in the prior art provided with no heat-resistant felt layer 6b, it has been found that the surface was in a state where zinc simply bit with a recessed part of the surface of the pass roll. Then, it has been found out, from the above knowledge, that the zinc winding is a phenomenon occurring due to scraping of zinc on the surface of the steel strip by the pass roll since the hardness of the surface of the pass roll is higher than the hardness of zinc fixed to the surface of the steel strip. In other words, by making the hardness of the heat-resistant felt layer 6b lower than the hardness of the galvanized layer on the surface of the steel strip S, it becomes possible to stably obtain the effect of suppressing the zinc winding by the exit-side pass roll 6. In particular, even in the case of using the same fibers, felt differs in hardness depending on the manufacturing conditions (for example, the porosity and the fixing way of felt), and therefore it is important to define the hardness of the heat-resistant felt layer 6b in order to stably obtain the effect of suppressing the occurrence of the zinc winding.

Figure 3:
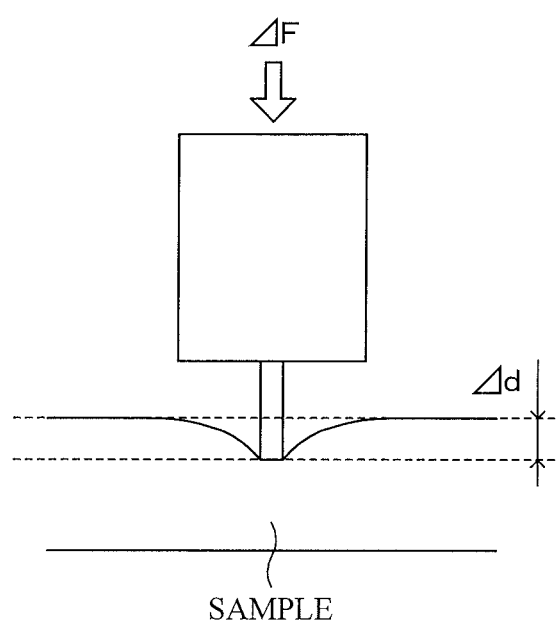
FIG. 3 is a view for explaining a method of measuring a surface hardness evaluation index.

In the case of an elastic body such as felt, there is no method of evaluating hardness in a high-temperature state. Hence, in order to derive a preferable relation in hardness between the heat-resistant felt layer 6b and the galvanized layer on the surface of the steel strip S, a surface hardness evaluation index is defined as a new index relating to the hardness of the heat-resistant felt layer 6b. For measurement of the surface hardness evaluation index, for example, a TMA (thermomechanical analyzer) being an apparatus which measures a high-temperature softening point of an organic substance is used. By the TMA the deformation quantity when a probe is pressed against a sample and an aperiodic load (constant load) at a certain temperature is applied can be measured. In this description, as illustrated in FIG. 3, the point where the tip of the probe comes into contact with the surface of the sample is regarded as a reference point, the variation in indentation load of the probe from the reference point is regarded as $\Delta F$, and the deformation quantity of the sample at the indentation position of the probe when the variation in indentation load becomes $\Delta F$ [N] is regarded as $\Delta d$ [μm]. Then, the value of $\Delta d/\Delta F$ [μm/N] at this time is defined as the surface hardness evaluation index. A larger numerical value of the surface hardness evaluation index means a lower surface hardness of the sample. Note that a probe having a tip diameter of 500 μm is used and the maximum load used for the evaluation is 18 g.

The present inventors measured the surface hardness evaluation index of the galvanized steel sheet at 400° C. The galvanized steel sheet measured here is a hot-dip galvanized steel sheet (GI) before being alloyed, and is a steel sheet of a type having a plating layer softest among the hot-dip galvanized steel sheets. The measured result is listed in following Table 1. Note that Table 1 also lists the surface hardness evaluation index at 400° C. in the case of using PBO fibers as the heat-resistant felt layer 6b.

TABLE 1

|  | $\Delta d$ [μm] | $\Delta F$ [N] | $\Delta d/\Delta F$ [μm/N] |
| --- | --- | --- | --- |
| GALVANIZED STEEL SHEET | 0.75 | 6.83 | 0.11 |
| HEAT-RESISTANT FELT LAYER (PBO) | 51.04 | 6.85 | 7.45 |

As listed in above Table 1, the surface hardness evaluation index of the galvanized layer on the surface of the steel strip S is 0.11 μm/N. As explained above, the galvanized steel sheet in Table 1 is a steel sheet of a type having a plating layer softest among the hot-dip galvanized steel sheet, so that the value of the surface hardness evaluation index at 400° C. is less than 0.11 μm/N in a hot-dip galvanized steel sheet of another type such as an alloyed hot-dip galvanized steel sheet (GA). Accordingly, the heat-resistant felt layer 6b manufactured to have a surface hardness evaluation index of more than 0.11 μm/N becomes soft relative to the plating layer of any type of the hot-dip galvanized steel sheet. Therefore, even if the heat-resistant felt layer 6b and the steel strip S come into contact with each other, the phenomenon that zinc fixed on the surface of the steel strip S is scraped is extremely unlikely to occur. Thus, it becomes possible to can stably obtain the effect of suppressing the occurrence of the zinc winding and increase the productivity of the hot-dip galvanized steel sheet with good quality.

From the viewpoint of increasing the difference in hardness with respect to the plating layer of the hot-dip galvanized steel sheet so as to more efficiently suppress the occurrence of the zinc winding, the surface hardness evaluation index of the heat-resistant felt layer 6b is more preferably 3 μm/N or more, and furthermore preferable 5 μm/N or more. The upper limit of the surface hardness evaluation index of the heat-resistant felt layer 6b is not particularly limited. Note that if the abrasion of the heat-resistant felt layer 6b advances and loses the function as the felt layer, the effect of suppressing the zinc winding is lost. Therefore, in order to avoid such a situation, it is necessary to exchange the heat-resistant felt covering the roll body 6a at the stage where the abrasion advances to some extent. More specifically, as the advance rate of abrasion of the heat-resistant felt layer 6b is higher, the exchange frequency of the heat-resistant felt further increases. Accordingly, from the viewpoint of decreasing the advance rate of abrasion of the heat-resistant felt layer 6b to decrease the exchange frequency of the heat-resistant felt so as to increase the productivity, the surface hardness evaluation index of the heat-resistant felt layer 6b is preferably 100 μm/N or less so as to prevent the heat-resistant felt layer 6b from becoming too soft with respect to the plating layer of the hot-dip galvanized steel sheet. Further, the heat-resistant felt layer 6b is preferably uniform in hardness in the thickness direction so as to prevent the magnitude of the effect of suppressing the zinc winding from varying accompanying the abrasion of the heat-resistant felt layer 6b.

One embodiment of the present invention has been explained above, but the present invention is not limited to the embodiment. It should be understood that various changes and modifications are readily apparent to those skilled in the art within the scope of the technical spirit as set forth in claims, and those should also belong to the technical scope of the present invention.

Figure 4:
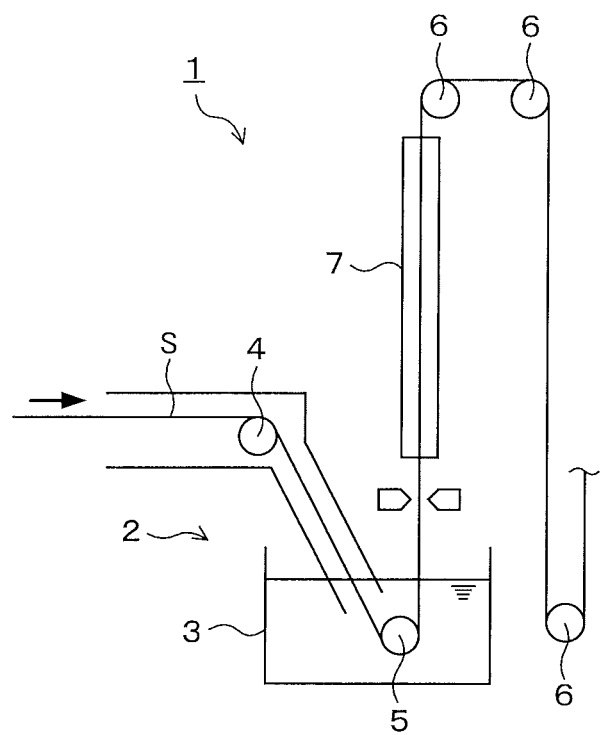
FIG. 4 is a diagram illustrating a partial configuration of a hot-dip galvanized steel sheet manufacturing facility according to another embodiment of the present invention.

Besides, the configuration of the hot-dip galvanized steel sheet manufacturing facility 1 is not limited to the one explained in the above embodiment, but may be provided with, for example, an alloying furnace 7 which performs an alloying treatment for galvanization, on the downstream side of the galvanizing bath 3 as illustrated in FIG. 4. In this case, since the surface of the steel strip S is in a high temperature state on the exit side of the alloying furnace 7, the thermal decomposition temperature of the heat-resistant felt layer 6b of the exit-side pass roll 6 installed on the downstream side of the alloying furnace 7 is preferably 420° C. or higher so as to prevent the effect of suppressing the zinc winding from being lost due to thermal decomposition.

In the above embodiment, although the heat-resistant felt layer 6b is provided only on the exit-side pass roll 6 of the hot-dip galvanized steel sheet manufacturing facility 1 including the hot-dip galvanizing treatment facility, the pass roll including the heat-resistant felt layer 6b is not limited to the above embodiment, and may be applicable as a pass roll which passes the steel strip S subjected to hot-dip galvanizing in the galvanizing bath. When the pass roll having the heat-resistant felt layer 6b is used as a roll which passes the steel strip S subjected to hot-dip galvanizing in the galvanizing bath, the effect of suppressing the zinc winding can be stably obtained.

EXAMPLES

The pass roll according to the present invention was applied as a top roll installed on the downstream side of the galvanizing bath, a sheet passing test was carried out for one month in the hot-dip galvanized steel sheet manufacturing facility. The maximum sheet temperature in the sheet passing test was 416° C., but the hot-dip galvanized steel sheet was able to be manufactured without causing a poor quality on the surface of the steel sheet or manufacturing troubles. Note that the PBO fibers were used as the heat-resistant felt layer, and the surface hardness evaluation index at 400° C. of the heat-resistant felt layer was 7.45 µm/N.

INDUSTRIAL APPLICABILITY

The present invention is usable in manufacturing a hot-dip galvanized steel sheet.

EXPLANATION OF CODES 1 hot-dip galvanized steel sheet manufacturing facility
2 hot-dip galvanizing apparatus
3 galvanizing bath
4 entry-side pass roll
5 in-bath roll
6 exit-side pass roll
6a roll body
6b heat-resistant felt layer
7 alloying furnace
Δd deformation quantity of sample
ΔF variation in indentation load of probe
S steel strip

The invention claimed is:
1. A pass roll for a hot-dip galvanized steel sheet manufacturing facility, the pass roll comprising:
a roll body; and
a heat-resistant felt layer covering the roll body, wherein
the heat-resistant felt layer is in direct contact with a surface of the roll body and has a thermal decomposition temperature of 420° C. or higher and has a surface hardness evaluation index at 400° C. of more than 0.11 µm/N and 100 µm/N or less.
2. The pass roll for the hot-dip galvanized steel sheet manufacturing facility according to claim 1, wherein
the heat-resistant felt layer is in contact with a surface of the roll body.
3. The pass roll for the hot-dip galvanized steel sheet manufacturing facility according to claim 2, wherein
the heat-resistant felt layer is made of polyparaphenylene benzobisoxazole fibers.
4. The pass roll for the hot-dip galvanized steel sheet manufacturing facility according to claim 3, wherein
a thickness of the heat-resistant felt layer is 1 to 20 mm.
5. The pass roll for the hot-dip galvanized steel sheet manufacturing facility according to claim 2, wherein
a thickness of the heat-resistant felt layer is 1 to 20 mm.
6. The pass roll for the hot-dip galvanized steel sheet manufacturing facility according to claim 1, wherein
the heat-resistant felt layer is made of polyparaphenylene benzobisoxazole fibers.
7. The pass roll for the hot-dip galvanized steel sheet manufacturing facility according to claim 6, wherein
a thickness of the heat-resistant felt layer is 1 to 20 mm.
8. The pass roll for the hot-dip galvanized steel sheet manufacturing facility according to claim 1, wherein
a thickness of the heat-resistant felt layer is 1 to 20 mm.
9. A hot-dip galvanized steel sheet manufacturing facility, wherein
the pass roll according to claim 1 is a roll configured to pass a steel strip subjected to hot-dip galvanizing in a galvanizing bath.
10. A hot-dip galvanized steel sheet manufacturing method for manufacturing a hot-dip galvanized steel sheet by immersing a steel strip in a galvanizing bath on a steel sheet manufacturing line, wherein
the hot-dip galvanized steel sheet is manufactured by using a pass roll according to claim 1 which is configured to pass the steel strip subjected to hot-dip galvanizing in the galvanizing bath, the pass roll comprising a roll body covered with a heat-resistant felt layer, the heat-resistant felt layer being in direct contact with a surface of the roll body and having a thermal decomposition temperature of 420° C. or higher and having a surface hardness evaluation index at 400° C. of more than 0.11 µm/N and 100 µm/N or less.
11. The hot-dip galvanized steel sheet manufacturing method according to claim 10, wherein
the heat-resistant felt layer is in contact with a surface of the roll body.
12. The hot-dip galvanized steel sheet manufacturing method according to claim 10, wherein
the heat-resistant felt layer is made of polyparaphenylene benzobisoxazole fibers.
13. The hot-dip galvanized steel sheet manufacturing method according to claim 10, wherein
a thickness of the heat-resistant felt layer is 1 to 20 mm.
14. A hot-dip galvanized steel sheet manufacturing facility, wherein
the pass roll according to claim 2 is a roll configured to pass a steel strip subjected to hot-dip galvanizing in a galvanizing bath.
15. A hot-dip galvanized steel sheet manufacturing facility, wherein
the pass roll according to claim 6 is a roll configured to pass a steel strip subjected to hot-dip galvanizing in a galvanizing bath.
16. A hot-dip galvanized steel sheet manufacturing facility, wherein
the pass roll according to claim 8 is a roll configured to pass a steel strip subjected to hot-dip galvanizing in a galvanizing bath.
17. A hot-dip galvanized steel sheet manufacturing facility, wherein
the pass roll according to claim 3 is a roll configured to pass a steel strip subjected to hot-dip galvanizing in a galvanizing bath.
18. A hot-dip galvanized steel sheet manufacturing facility, wherein
the pass roll according to claim 5 is a roll configured to pass a steel strip subjected to hot-dip galvanizing in a galvanizing bath.
19. A hot-dip galvanized steel sheet manufacturing facility, wherein
the pass roll according to claim 7 is a roll configured to pass a steel strip subjected to hot-dip galvanizing in a galvanizing bath.

20. A hot-dip galvanized steel sheet manufacturing facility, wherein
the pass roll according to claim 4 is a roll configured to pass a steel strip subjected to hot-dip galvanizing in a galvanizing bath.

\* \* \* \* \*